(12) United States Patent
Huang et al.

(10) Patent No.: US 9,898,404 B2
(45) Date of Patent: Feb. 20, 2018

(54) METHOD AND APPARATUS FOR PROVIDING IMPROVED GARBAGE COLLECTION PROCESS IN SOLID STATE DRIVE

(71) Applicants: Yiren Ronnie Huang, San Jose, CA (US); Aaron Huang, San Jose, CA (US)

(72) Inventors: Yiren Ronnie Huang, San Jose, CA (US); Aaron Huang, San Jose, CA (US)

(73) Assignee: CNEX LABS, San Jose, CA (US)

( * ) Notice: Subject to any disclaimer, the term of this patent is extended or adjusted under 35 U.S.C. 154(b) by 201 days.

(21) Appl. No.: 14/315,172

(22) Filed: Jun. 25, 2014

(65) Prior Publication Data

US 2015/0019797 A1    Jan. 15, 2015

Related U.S. Application Data

(60) Provisional application No. 61/846,039, filed on Jul. 14, 2013.

(51) Int. Cl.
| | | |
|---|---|---|
| *G06F 12/00* | (2006.01) | |
| *G06F 12/02* | (2006.01) | |
| *G06F 3/06* | (2006.01) | |

(52) U.S. Cl.
CPC ........ *G06F 12/0246* (2013.01); *G06F 3/0608* (2013.01); *G06F 3/0641* (2013.01); *G06F 3/0652* (2013.01); *G06F 3/0679* (2013.01); *G06F 2212/7201* (2013.01)

(58) Field of Classification Search
CPC .. G06F 12/0246; G06F 3/0608; G06F 3/0641; G06F 3/0652; G06F 3/0679; G06F 2212/7201
See application file for complete search history.

(56) References Cited

U.S. PATENT DOCUMENTS

| | | | |
|---|---|---|---|
| 7,975,109 B2* | 7/2011 | McWilliams | G06F 12/0284 711/141 |
| 8,447,740 B1* | 5/2013 | Huang | G06F 17/30156 707/640 |
| 8,527,544 B1* | 9/2013 | Colgrove | G06F 3/0608 707/791 |

(Continued)

*Primary Examiner* — Charles Rones
*Assistant Examiner* — Nanci Wong
(74) *Attorney, Agent, or Firm* — James M. Wu; JW Law Group

(57) ABSTRACT

An improved garbage collection ("GC") process configured to recover new blocks from used storage space is disclosed. After initiating the GC process for a flash memory in accordance with at least one of predefined triggering events, a first valid page within a first block marked as an erasable block is identified. Upon determining a first signature representing the content of the first valid page according to a predefined signature generator, the process identifies a second valid page within a second block as a duplicated page of the first valid page in response to the first signature. The process subsequently associates the logical block address ("LBA") of the first valid page to the second valid page. In an alternative embodiment, page compression and sequential order of page arrangement can also be implemented to further enhance efficiency of garbage collection.

18 Claims, 8 Drawing Sheets

(56) References Cited

U.S. PATENT DOCUMENTS

| | | | | |
|---|---|---|---|---|
| 2010/0174851 | A1* | 7/2010 | Leibowitz | G06F 3/0616 711/103 |
| 2011/0231622 | A1* | 9/2011 | Kawamura | G06F 3/0619 711/155 |
| 2012/0102260 | A1* | 4/2012 | Kawamura | G06F 3/0608 711/103 |
| 2012/0260060 | A1* | 10/2012 | Hwang | G06F 12/0238 711/216 |
| 2013/0067138 | A1* | 3/2013 | Schuette | G06F 3/0616 711/103 |

* cited by examiner

US 9,898,404 B2

METHOD AND APPARATUS FOR PROVIDING IMPROVED GARBAGE COLLECTION PROCESS IN SOLID STATE DRIVE

PRIORITY

This application claims the benefit of priority based upon U.S. Provisional Patent Application Ser. No. 61/846,039, filed on Jul. 14, 2013 in the name of the same inventor(s) and having a title of "Method for Garbage Collection in Solid State Drive Controller," hereby incorporated into the present application by reference.

FIELD

The exemplary embodiment(s) of the present invention relates to digital computing systems. More specifically, the exemplary embodiment(s) of the present invention relates to non-volatile memory devices.

BACKGROUND

A solid state drive ("SSD") is a memory device capable of retaining data persistently without connecting to a power supply. The SSD uses various non-volatile memory devices such as NAND based flash memory to store data or electronic information. With rapidly increasing storage capacity associated with non-volatile memory, SSD becomes more popular for storing non-volatile data for various types of computing systems, such as laptop computers, desktop computers, mobile devices, tablets, servers, routers, network devices, and the like.

A flash memory device is typically organized in multiple blocks wherein each block is further divided into a set of pages. In some examples, each page can be further divided into multiple addressable sectors. In general, a minimum writeable data unit is a page and a minimum erasable unit is a block. Typically, a page can store up to four (4) kilobytes ("KB"). However, with technological advancement in flash memory density, the page size has grown from 4 to 8, 16, or even 32 KB. To recover or reuse storage space that contain garbage data or stale data, such storage space needs to be cleaned, erased, or deleted first before it can be rewritten with new data. When a block, for example, is ready to be erased, it is marked as an erasable block. An erasable block generally contains 256 pages wherein the content of all pages will be deleted when the block is erased.

A drawback associated with erasing content of a block is that a block cannot be erased if one of the pages contains valid data. Before erasing, any valid pages within an erasable block need to be moved or copied to a new block. During a write operation, data, however, is typically written in a random order which generally causes fewer pages getting overwritten. Such overwritten pages become garbage or stale pages overtime. In order to free up or reuse the blocks containing stale data, a garbage collection procedure can typically be used to recover old blocks into new blocks. A problem, however, associated with a conventional garbage collection ("GC") procedure is that it can consume a substantially amount of writing resources which could impact overall storage performance.

SUMMARY

One embodiment of the present invention discloses an apparatus and/or method capable of recovering and/or reusing storage space containing stale data in a non-volatile memory device. After initiating a process of garbage collection in a non-volatile memory such as flash memory in accordance with at least one of the predefined triggering events, a first valid page within a first block marked as an erasable block is identified. Upon determining a first signature representing the content of the first valid page according to a predefined signature generator, the process identifies a second valid sector within a second block as a duplicated page of the first valid page in accordance with the first signature. The process subsequently associates the logical block address ("LBA") of the first valid page to the second valid page. In an alternative embodiment, page compression and sequential order of page arrangement can also be implemented to enhance efficiency of garbage collection process.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
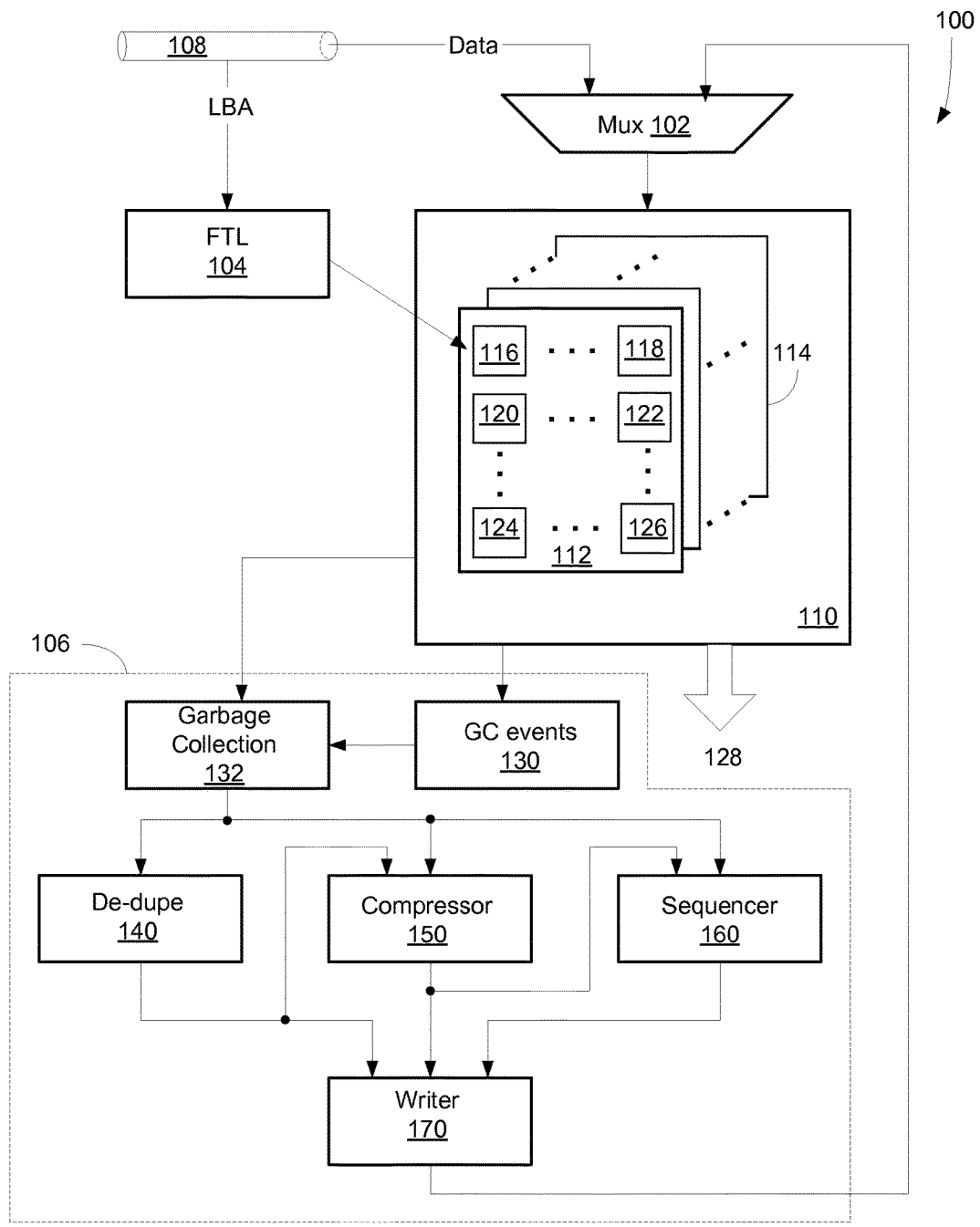
FIG. 1 is a block diagram illustrating a memory device configured to improve efficiency in garbage collection ("GC") in accordance with one embodiment of the present invention.

Embodiments of the present invention are described herein with context of a method and/or apparatus for improving efficiency in garbage collection using a mechanism of de-dupe, page compression, and/or sequential order of pages.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, subsystems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

One embodiment of the present invention discloses an improved process for garbage collection in a non-volatile memory device such as an SSD. For example, after initiating a process of garbage collection in a non-volatile memory such as flash memory according to a predefined set of triggering events, a first valid page within a first block marked as an erasable block is identified. A signature generator generates a first signature representing the content of first valid page. After comparing the first signature with various signatures stored in a signature table, a second valid page in a second block is identified. The second valid page is a duplicated page of the first valid page since their signatures are matched. The process sets the logical block address ("LBA") of the first valid page pointing to the second valid sector.

FIG. 1 is a block diagram 100 illustrating a memory device configured to improve efficiency in garbage collection ("GC") in accordance with one embodiment of the present invention. Diagram 100 includes input data 108, memory device 110, output data 128, and memory controller 106. Memory controller 106 further includes GC 132, GC events 130, de-dupe module 140, compressor 150, sequencer 160, and writer module 170. Diagram 100 also includes a flash translation layer ("FTL") 104 which can be part of memory controller. FTL 104, for example, maps LBAs to physical addresses. It should be noted that the underlying concept of the exemplary embodiment(s) of the present invention would not change if one or more blocks (or devices) were added to or removed from diagram 100.

Diagram 100 illustrates a logic diagram of SSD using a group of flash memory 110 to persistently retain information without power supply. The SSD includes multiple non-volatile memories or flash memory blocks 112-114, FTL 104, and memory controller 106 which further includes GC 132, GC events 130, and de-dupe module 140. Non-volatile memory blocks 112-114 are configured by a group of flash memory blocks wherein each of blocks includes a set of pages. In one example, a block can contain from 128 to 512 pages. Note that a flash memory page is a minimal writable unit.

Memory controller 106 manages the process of GC or GC process based on GC triggering events managed by GC events 130 for recovering new storage space from blocks containing the "old" or "stale" data. It should be noted that the terms "process of GC," "GC process," and "GC procedure" are directed to the same process and can be used interchangeably. To improve memory performance, memory controller 106 includes compressor 150 to compress content of each page to conserve storage space. For example, compressor 150 is able to generate a compressed valid page before being written to a new block. If the compression scheme is able to provide 2-to-1 data compression, two valid pages can be compressed into a single page space in a new block. Alternatively, if a 4-to-1 compression scheme is used, four (4) valid pages can be compressed and written into a single page in a new block. To further enhance the efficiency in GC, a sequencer 160 is used to arrange pages in a sequential order before being moved or written to a new block or blocks.

GC 132, in one embodiment, includes a garbage collection manager configured to recover storage space based on predefined GC triggering events 130. With the scanning capability, GC is able to generate a list of garbage block identifiers ("IDs") or erasable block IDs. GC is also able to identify valid page IDs within one or more of the garbage block IDs. It should be noted that GC 132, GC events 130, de-dupe module 140, compressor 150, and/or sequencer 160 can be independent components.

De-dupe module or du-dupe 140, in one embodiment, is capable of identifying a duplicated page in a valid block based on identified valid page in an erasable block. De-dupe module 140 includes a hasher and a signature table. The hasher, also known as signature generator, is able to generate a unique signature through a hashing operation. The hasher hashes the content of valid page to come up with an identifiable unique signature based on the content of page. The signature, in one aspect, is a combination of bits used specifically for identifying the content of a page. The signature table, in one example, is used to store signatures associated with valid pages in various valid blocks.

In operation, when a GC process is initiated by GC events 130 based on a set of predefined triggering events, memory 110 is scanned to identify IDs of erasable blocks as well as IDs of valid page(s) within the identified erasable blocks. For example, after determining a valid page, de-dupe 140 identifies whether a duplicated page containing the same or substantially the same content as the valid page in other valid block(s). The valid block indicates a block that has not been marked for deletion or erasing. An erasable block, on the other hand, is a block that has been marked for deletion or erasing. When a duplicated page is identified by de-dupe 140 based on the signatures, FTL 104 is updated to cause the LBA of valid page to point to the physical page address ("PPA") of the duplicated page. In the event that a duplicated page of the valid page is not found, the GC process, in one embodiment, activates compressor 150. Compressor 150, which can be hardware or software capable of providing page compression, generates a compressed valid page in accordance with the valid page. The compressed valid page contains the same or substantially the same information as the valid page. The size of compressed valid page is reduced in comparison with the size of valid page. Depending on the applications, compressor 150 may or may not be activated or present. After reaching sequencer 160, pages requiring rewriting are arranged or sorted in a sequential order. The valid pages, compressed valid pages, and/or sequentially ordered valid pages are subsequently rewritten or moved to a new block(s) via module 170. Depending on the applications, sequencer 160 can be inactive. If sequencer 160 is absent or inactive, the compressed valid page generated by compressor 150 is written to a new block. Also, in the event that the duplicated page is not found, and both compressor 150 and sequencer 160 are absent, writer module 170 receives the output from de-dupe 140 and rewrites or copies the valid page in a new block via multiplexer ("mux") 102 before the erasable block is erased.

It should be noted that mux 102 also receives data from data stream 108. LBAs associated with the data are forwarded to FTL 104 for memory mapping between LBA and PPA. Note that de-dupe 140, compressor 150, and sequencer 160 can be selectively activated or deactivated based on the applications.

An advantage of employing improved GC using de-dupe, compressor, and sequencer is that it reduces the size of data to be rewritten during the GC process. For example, the GC arranges data in a sequential order whereby it reduces the write-amplification factor. If an erasable block contains one or more valid pages, these valid pages are required to be moved to a different location (i.e., a new block) before the erasable block can be erased or cleaned.

Figure 2:
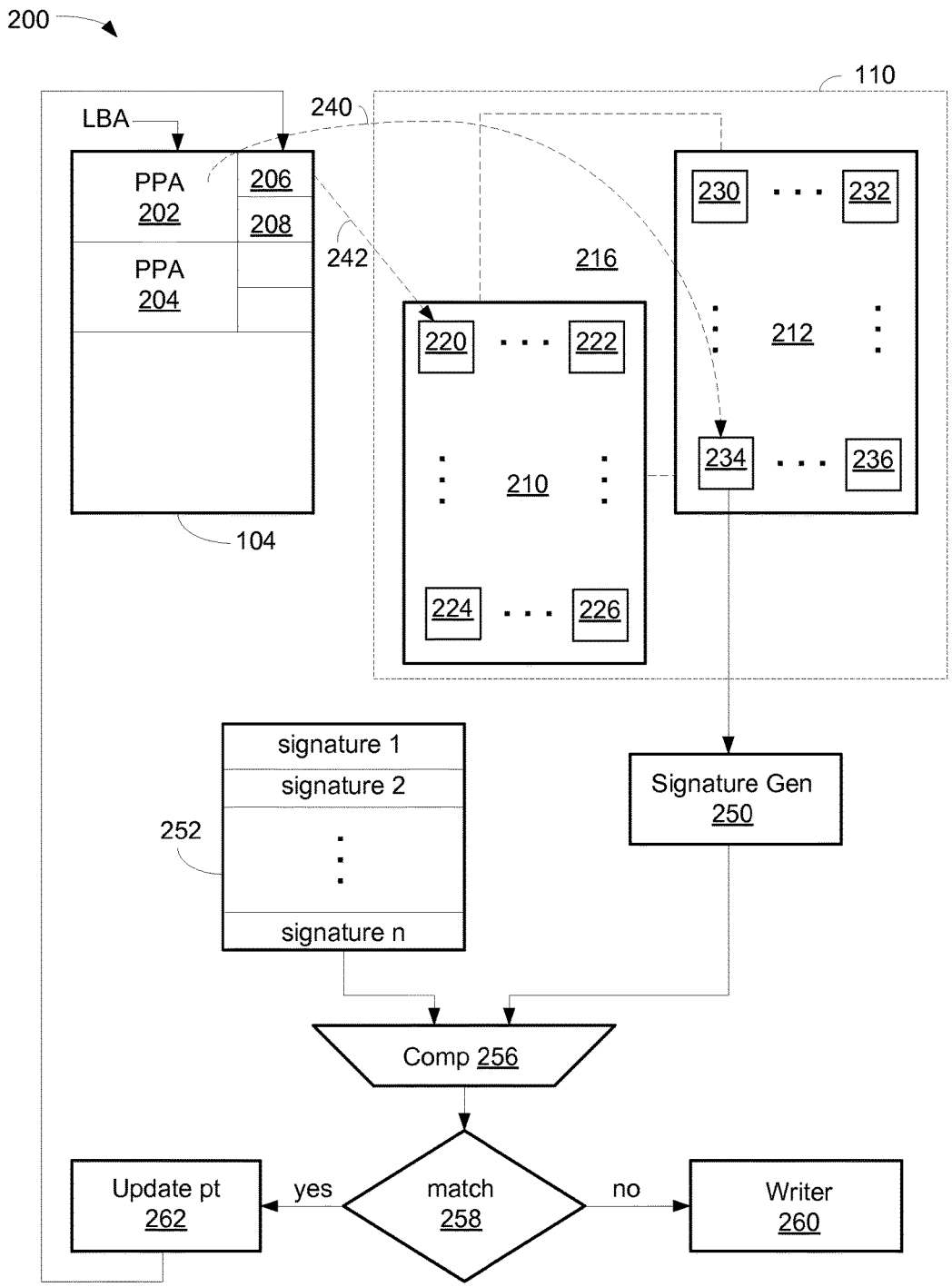
FIG. 2 is a block diagram illustrating a logic flow showing a de-dupe process in accordance with one embodiment of the present invention.

FIG. 2 is a block diagram 200 illustrating a logic flow showing a de-dupe process in accordance with one embodiment of the present invention. Diagram 200 includes memory 110, FTL 104, signature table 252, signature generator 250, and comparator 256. Memory 110, in one example, includes multiple blocks 210-216 where in each block includes a group of pages such as pages 220-226 or 230-236. It should be noted that the underlying concept of the exemplary embodiment(s) of the present invention would not change if one or more blocks (or devices) were added to or removed from diagram 200.

To simplify implementation of non-volatile memory operation, FTL 104 provides an interface mapping between logical addresses and physical addresses. To simplify forgoing discussion, the flash memory is used as an exemplary non-volatile memory. It should be noted that other types of non-volatile memory such as read-only memory (ROM) and ferroelectric random access memory (FRAM) may be used in place of flash memory. A function of FTL 104 is to translate between LBA and PPA. PPA addressed by LBA, in one embodiment, points to a page in a flash memory. Depending on the applications, PPA may also be configured to point to a sector or a portion of a page in a flash memory.

To map between LBA and a physical page address in flash memory, FTL 104 contains a map table which stores mapping information. For example, FLT 104 includes various PPAs 202-204 wherein each PPA includes other information such as pointer 206 and validity flag 208. PPA 202 or 204 is a physical address pointing to at least one sector of a flash memory page based on an LBA. Pointer 206, in one embodiment, is used to point to a duplicated page in a block that contains the same content as a page addressed by LBA which translates to PPA 202. Validity flag 208, in one example, is used to indicate whether the addressed page is currently valid.

In one embodiment, PPA 202 includes a counter used to implement de-dupe or de-duplication. The counter in the PPA, which is not shown in FIG. 2, is configured to keep track of the number of LBAs pointing to the PPA data unit. For example, when a duplicate copy is found during a matching process of a list of PPAs or signatures, the value of counter is incremented to reflect the page duplication. If an LBA pointing to a PPA is removed, the counter, for example, is decremented. In one embodiment, when the counter is decremented to a value zero (0), the entry (i.e., page or sector) addressed by the LBA is ready to be deleted using garbage collection.

Diagram 200 illustrates an exemplary de-dupe (de-duplication) process which can be initiated during a GC process requiring data to be copied (or moved) from an old data block marked for deletion to a new data block. In order to de-dupe the data, signature generator 250 generates a hash value or signature based on the content of valid page such as page 234 in block 212 which is marked for deletion. Note that the signature or hash value is generated over the whole data set within page 234 or content of page 234. After generating a signature for page 234, comparator 256 compares the signature of page 234 with every entries of signature table 252. Signature table 252 stores multiple signatures indicating valid pages currently in memory 110. If the signature of page 234 matches with one of the entry in signature table 252 as indicated by numeral 258, a duplicated page in a block is identified. Noted that the hash values (or signatures) of pages containing the same data (or content) are the same. If a duplicated data or page such as page 220 is detected, FTL pointer 206 is updated as indicated by numeral 262 to indicate the LBA of page 234 to address or point to PPA of page 220 as indicated by dash lines 240-242. In the event that no duplication is found, the process proceeds to writer block 260. Writer block 260 copies or rewrites the data or content of page 234 to new page in a new block.

During an operation, upon identifying a data block subject to a garbage collection, a list of physical addresses of valid pages within the data block that need to be moved for garbage collection is determined. After applying de-dupe procedure in accordance with the list of valid pages, the valid pages are not rewritten or moved if duplicated pages are found in other blocks. If duplicated pages are not found, the valid pages are rewritten to a new block(s) before erasing the erasable block(s). Note that an erasable block means a block subject to the garbage collection.

An advantage of employing the de-dupe process is that it conserves storage space by identifying duplicated pages in other blocks whereby the overall memory performance is enhanced. Also, minimizing rewriting operation can also extend lifetime of flash memory.

Figure 3:
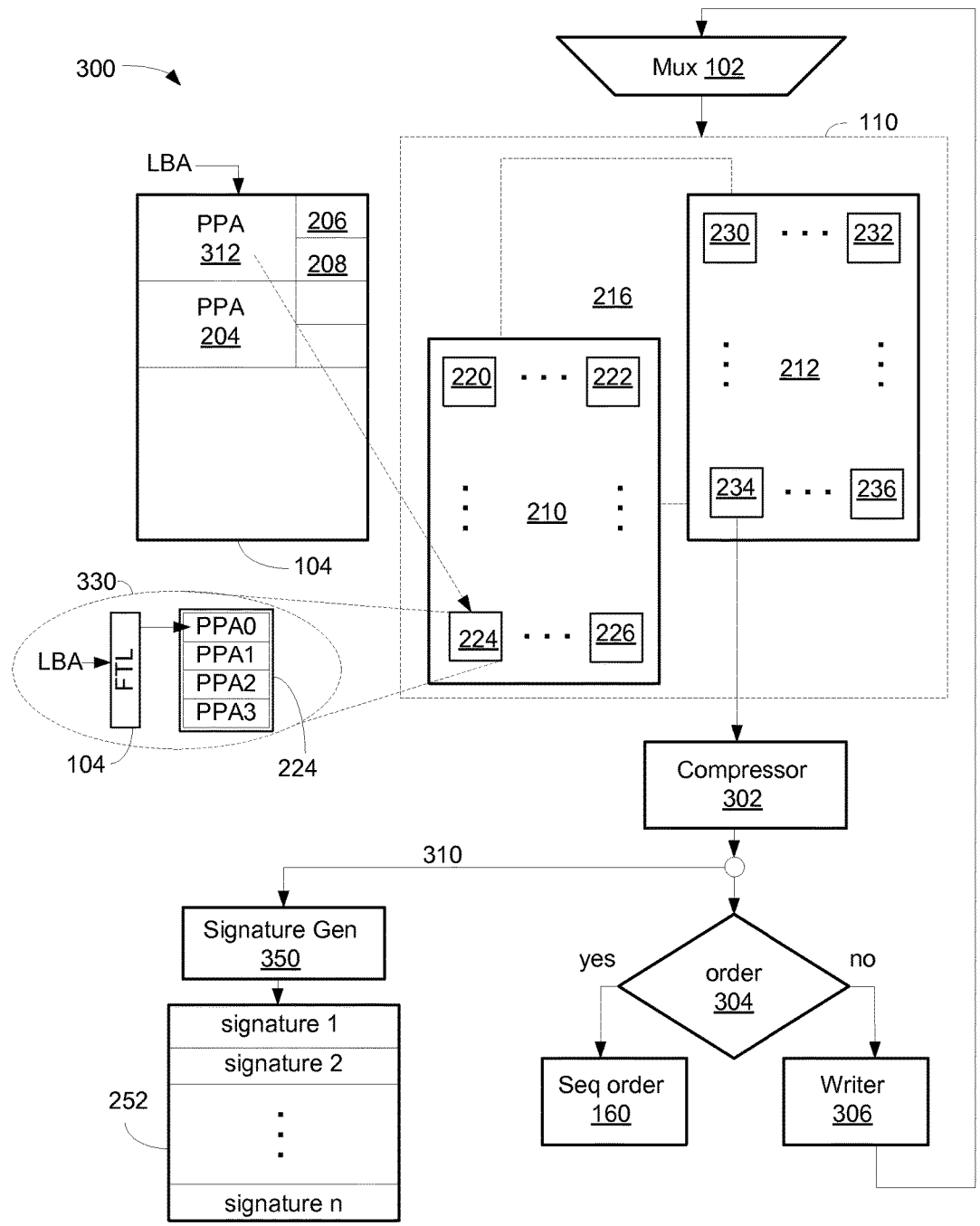
FIG. 3 is a block diagram illustrating a GC process using page compression in accordance with one embodiment of the present invention.

FIG. 3 is a block diagram 300 illustrating a GC process using data compression in accordance with one embodiment of the present invention. Diagram 300 includes memory 110, FTL 104, signature table 252, signature generator 350, and compressor 302. Memory 110, in one example, includes multiple blocks 210-216 where in each block includes a group of pages such as pages 220-226 or 230-236. The process of data compression, in one embodiment, can be implemented independently from de-dupe and/or sequencer. It should be noted that the underlying concept of the exemplary embodiment(s) of the present invention would not change if one or more blocks (or devices) were added to or removed from diagram 300.

The GC process identifies block 212 as an erasable block wherein page 234 is still valid. Compressor 302 compresses the content of page 234 based on a predefined compression rules. After compressing, the compressed page, which is reduced size of original valid page, is forwarded to signature generator 350 for generating a signature based on compressed page. If de-dupe is activated, the de-dupe procedure would begin. At block 304, the GC process determines whether a sequential order is required. If it is, sequencer 160 begins arranging pages in a sequential order. If sequencer is inactivated, writer module 306 rewrites the compressed page to a new page in a new block such as page 224 in block 210. If 4-to-1 compression ratio is achieved, compressed page can be stored in PPA0 page of page 224 as indicated by numeral 330. It should be noted that page 224 can store up to four (4) 4-to-1 compressed pages.

It should be noted that LBA can be used to address a sector of a page whereby multiple LBAs may be required to address all sectors of a page. Alternatively, depending on the applications, LBA can be configured to address or point to a page. To simplify forgoing discussion, the LBA addressing to a page unit is used.

An advantage of employing the compressor is that it reduces storage space as well as reduces rewriting operation.

Figure 4:
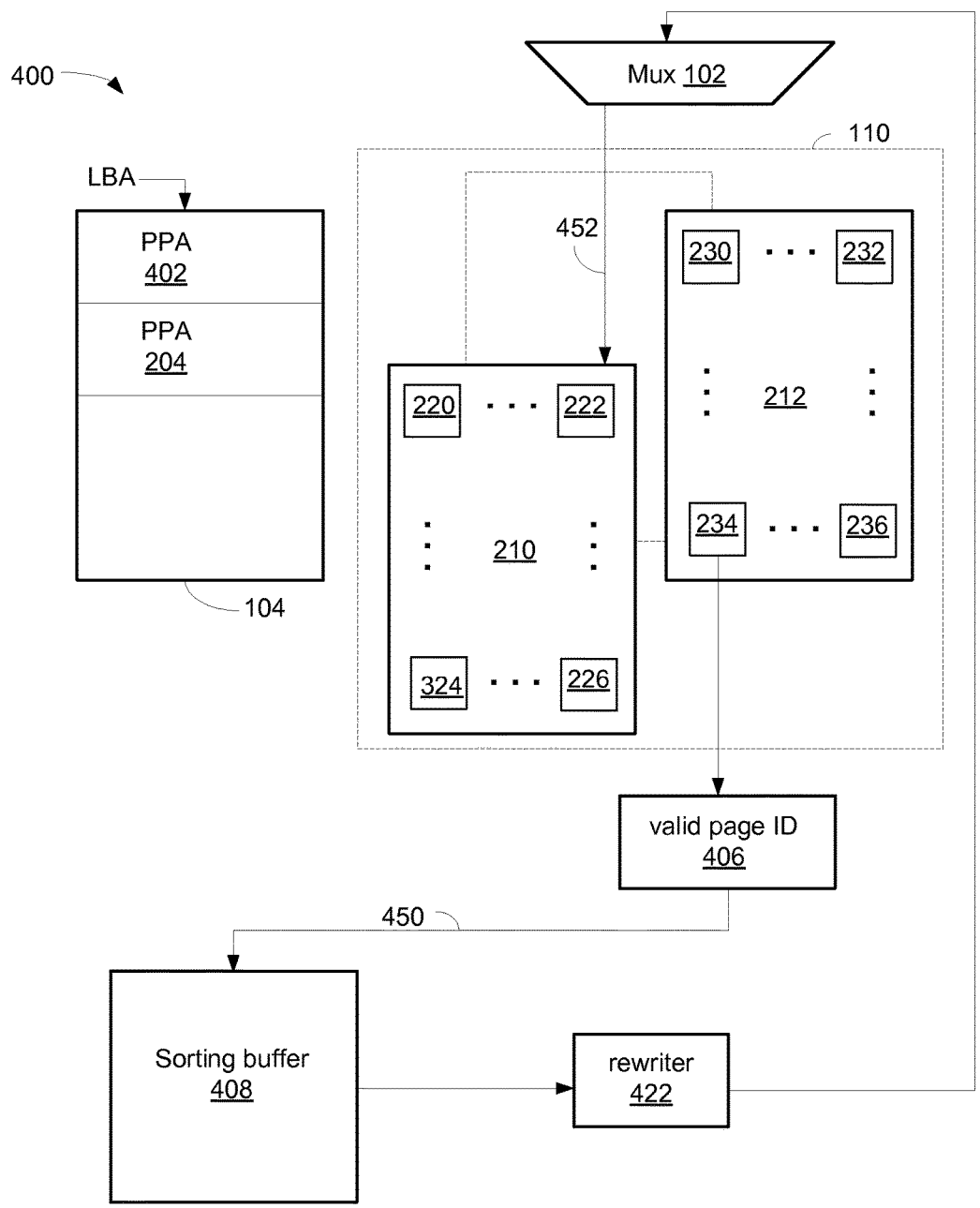
FIG. 4 is a block diagram illustrating a logic flow of rewriting valid pages in a sequential order during a GC process in accordance with one embodiment of the present invention.

FIG. 4 is a block diagram 400 illustrating a logic flow of rewriting valid pages in a sequential order during a GC process in accordance with one embodiment of the present invention. Diagram 400 includes flash memory 110, FTL 104, valid page identifier 406, sorting buffer 408, and rewriter 422. Memory 110, in one example, includes multiple blocks wherein block 210 is a new block containing rewritten pages organized in a sequential order and block 212 is an erasable block marked for deletion. It should be noted that the underlying concept of the exemplary embodiment(s) of the present invention would not change if one or more blocks (or devices) were added to or removed from diagram 400.

Upon activation of GC, valid page identifier 406 identifies a list of valid pages in various blocks marked for deletion, for example, block 212. After forwarding the information relating to the valid pages to sorting buffer 408 via connection 450, valid pages are arranged in a sequential order. Rewriter 422 subsequently rewrites valid pages to new blocks such as block 210 in a sequential order. Upon completion of the rewriting, the content of block 212 is deleted or erased. Once the pages are stored in a sequential order, subsequent rewriting operations during the GC process will be reduced.

It should be noted that pages are originally stored in a random order during initial host input/output ("IO") access. After rewriting in a sequential order during a GC process, the write amplification factor will be reduced in SSD. The write amplification factor reflects how many new pages are written based on how many host initiated writes are. When the data is written into the block sequentially according to logical blocks addresses (e.g., from 1 to 256 or from 257 to 512), rewriting valid pages during a GC process is minimized because pages are overwritten in the same erasable block(s). When the data are written in a sequential order, the write amplification factor is normally close to one (1). The pages are organized in a sequential order in a block also improves write performance drop which is also called "write cliff".

The "write cliff," which is a drop in writing speed, can indicate a drop of writing bandwidth between 60% and 90% due to a random data pattern. Upon rewriting of data from a random order to a sequential order, the writing speed can improve up to 80%. It should be noted that data is stored in a random order during a host initiated IO writes. For example, a server application performs transactions for users at different times and writes data to the SSD drive randomly using LBAs. Once the data is rewritten in a sequential order during a GC process, the subsequent writing operation of valid page(s) from an erasable block is reduced.

An advantage of implementing sequential order during a GC process is that it minimizes rewriting operation during subsequent GC processes and improves overall system performance. For instance, optimizing rewriting operation can improve host and/or CPU (central processing unit) access to SSD.

Figure 5:
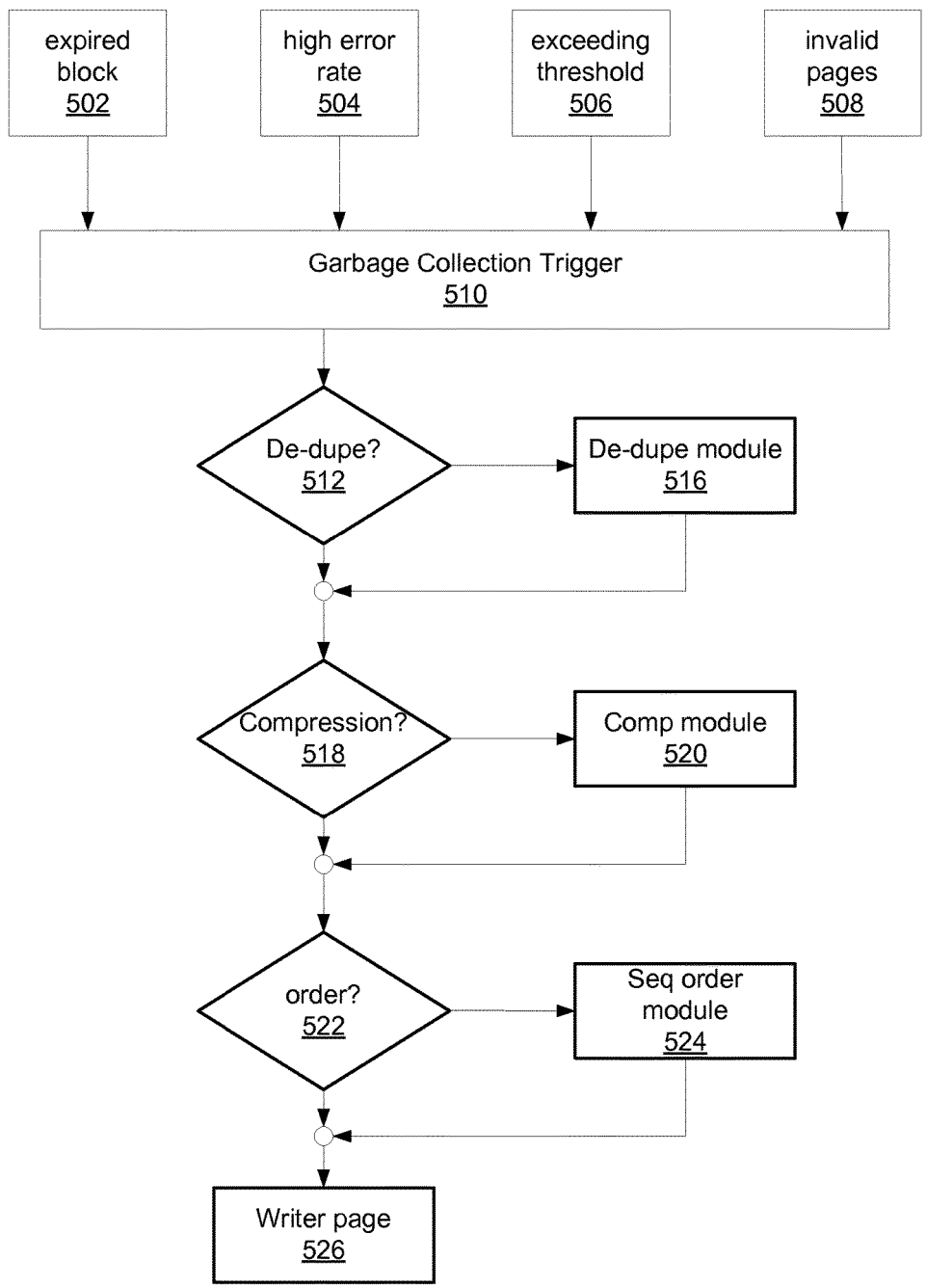
FIG. 5 is a block diagram illustrating a process of garbage collection including de-dupe, compression, and sequential order in accordance with one embodiment of the present invention.

FIG. 5 is a block diagram 500 illustrating a process of garbage collection including de-dupe, compression, and sequential order in accordance with one embodiment of the present invention. Diagram 500 includes GC trigger 510, de-dupe module 516, compressor module 520, and sequencer module 524. GC trigger 510 is further coupled to an expired block unit 502, high-error rate unit 504, exceeding threshold unit 506, and invalid pages unit 508. It should be noted that the underlying concept of the exemplary embodiment(s) of the present invention would not change if one or more blocks (or devices) were added to or removed from diagram 500.

In one embodiment, a GC process is triggered by various predefined events or conditions. To identify which block or blocks should be marked as deletion or erasing, one or more of the following criteria, such as expired block, high-error rate, exceeding threshold, and/or invalid pages, may have occurred. For example, expired block 502 indicates that a block has been written too long ago. The GC process verifies data retention period that a block should expire and/or the block data needs to be refreshed. Note that an arbitrary data retention time can be set for the flash memory (e.g., three months to a year). When a block or blocks are expired based on a predefined value, a GC process is triggered.

High error rate unit 504 examines any page in the block that experiences high-error rate during a read operation. For example, the high-error rate can be determined by an error correction coding (ECC) decoder. When a high-error rate associated with a read operation is detected, a GC process is initiated by GC trigger 510.

Exceeding threshold unit 506 is configured to identify a total number of read times relating to pages in a block that has exceeded a certain threshold. For example, the threshold for a flash memory page may be set to 100,000 to 1 million times over its lifetime. A GC process is initiated when the read times exceeded the read threshold of a block.

GC trigger 510 can also initiate a GC process when unit 508 detects a number of invalid pages that exceeds a threshold. For example, if 250 pages in a block are invalid, a GC process is triggered. Note that the threshold can be varied depending on how many free blocks are available for receiving new data.

In operation, the pages that need to be moved for garbage collection are indentified. The valid pages from the block subjected to garbage collection need to be copied and moved to a new block. Once the blocks that need garbage collection are identified, the process maps LBA to physical block address based on mapping lookup. The GC process determines whether any valid physical pages that belong to the erasable block are valid. If it is, then any valid pages in the erasable block need to be moved to a new block.

In one embodiment, a linear scan during a GC process discovers valid data pages in the erasable block(s) to be written into a new block according to a sequential order. Note that rewriting pages in a sequential order in a block can reduce subsequent write amplification. In addition, the pages can be compressed prior to being moved from the old data block. The data compression allows maintaining host write bandwidth while executing the GC process. If the compression ratio is 2-to-1, 256 KB of data page, for example, can be moved into a space of 128 KB and another 128 KB are freed up in the page.

The GC process is activated by GC trigger 510 in response to at least one of expired block 502, high-error rate 504, exceeding threshold 506, and/or invalid pages 508. The GC process checks at step 512 whether a de-dupe operation should take place. If the de-dupe operation is present, the process proceeds to module 516 to perform a de-dupe operation. Otherwise, the GC process proceeds to step 518 examining whether a compression operation should be performed. If it is, the process proceeds to module 520 to carry out a compression task. Otherwise, the GC process proceeds to step 522 to identify whether rewriting pages in a sequential order should be implemented. If it is, the GC process proceeds to module 524 to rewrite pages in a sequential order. Otherwise, the process proceeds to module 526 to rewrite pages or compressed pages to the memory.

In an exemplary operation, a GC process for recovering storage space in a flash memory system initiates a garbage collection in accordance with one of the predefined triggering events. For example, the triggering events could be expired blocks, high error rate during page read, exceeding total read times, and/or high invalid pages during read operation. A first valid page is identified within a first block marked as an erasable block. The content of the first valid page is compressed to reduce number of bytes representing the first valid page. A first signature representing the first valid page is determined in accordance with a predefined signature generator. A second valid page in a second block is subsequently identified as a duplicated page of the first valid page when the first signature matches with a signature associated with the second valid page. The compressed first valid page is rewritten to a new valid block if no duplicated page(s) is found. In an alternative embodiment, compressed valid pages including the compressed first valid page are rearranged or rewritten in a sequential order. A signal is issued to the GC process indicating that the first valid page has been moved from the erasable block and the erasable block is ready to be deleted or erased.

Figure 6:
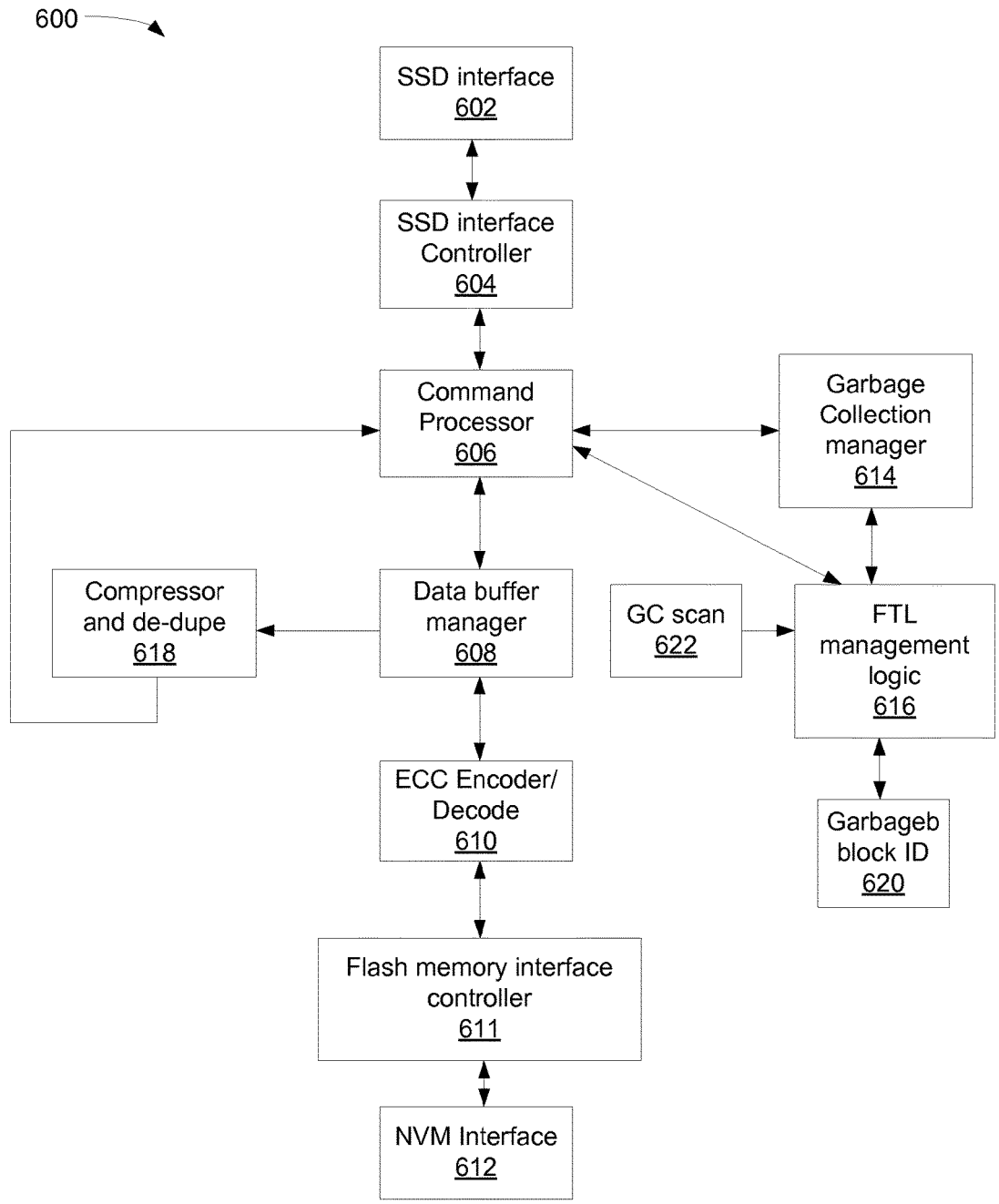
FIG. 6 is a block diagram illustrating an exemplary logic process of garbage collection used in a flash memory in accordance with one embodiment of the present invention.

FIG. 6 is a block diagram 600 illustrating an exemplary logic process of garbage collection used in a flash memory in accordance with one embodiment of the present invention. The flash memory includes SSD interface 602, SSD interface controller 604, command processor 606, data buffer manager 608, Error Correction Coding ("ECC") encoder/decoder unit 610, flash memory interface controller 611, non-volatile memory ("NVM") interface 612, compressor and de-dupe module 618, FTL 616, and GC manager 614. GC manager 614, in one example, further includes GC scan 622 and GC block identifier 620. While SSD interface 602 connects to command processor 606, data buffer manager 608 is positioned between command processor 606 and flash memory interface controller 611. Garbage collection manager 614 is positioned between command processor 606 and FTL management logic 616.

ECC encoder/decoder unit 610 is connected to data buffer manager 608 and flash memory interface controller 611 wherein ECC encoder adds error correction code to pages being written into flash memory interface 611. ECC decoder decodes error correction code for pages being read-out of flash memory interface 611. Compressor and de-dupe module 618 is connected to data buffer manager 618. Garbage block identifier 620 is connected to FTL management logic 616 and identifies a data block subject to a garbage collection. FTL management logic 616 determines physical addresses of valid pages within the data block that need to be moved for garbage collection. Data buffer manager 608 buffers valid pages. Compressor and de-dupe module 618 compresses the valid pages and applies de-duplication procedure to the valid pages. Note that de-dupe process is also known as deduplication procedure. Command processor 606 moves the valid pages to a new data block while garbage collection manager 614 erases the data block subject to the garbage collection.

A GC process implemented by a SSD controller is capable of scanning through entire range of LBA space. SSD control interface 602 communicates with command processor 606 and send write or read command to processor 606. The commands can indicate a starting address of the sector for read or write operation. Processor 606 or flash command control interface 611 sends outstanding commands to data buffer manager 608. The command can also identify controller 611 to command processor 606.

Data buffer manager 608 stores the data coming from SSD interface 602 via command processor 606. The data is buffered in data buffer manager 608 before it is written into the flash memory. The data can be read from the flash memory interface and also temporarily stored or buffered in data buffer manager 608.

ECC encoder/decoder unit 610 is located between data buffer manager 608 and flash memory interface 611. ECC encoder 610 attaches the ECC parity bytes to the page. The ECC decoder 610 reads the parity bytes of the data pages being read from flash memory interface 611 and provides error correction operations for data integrity.

Flash memory interface controller logic 611 is used for executing the flash memory commands. Compressor and de-dupe module 618 receives data from data buffer manager 608 and returns the compressed data to command processor 606. The data is subsequently provided to garbage collection manager 614. Garbage collection manager 614 moves the valid data to a new data block and erases the old data block. It should be noted that the process can be done by a processor or by a hardware state machine. Note that the data is written into new block in a sequential order to improve efficiency in subsequent GC process.

FTL management logic 616 translates LBAs to physical addresses of pages within blocks. The translation is basically a lookup of LBAs to PPAs via a mapping memory. The physical address of a page is checked by the erasable block identifier to see if the erasable data block containing the page belongs to the target of garbage collection. Garbage collection manager 614 uses the physical page address to apply garbage collection and update the FTL table. The FTL mapping memory content will be updated to the new physical page address. Garbage collection manager 614 subsequently moves the compressed data to the new block. When the compressed data is read from the flash memory, it will need to be identified by data buffer manager 608 or some read processing unit wherein the data needs to be uncompressed before returning to SSD interface 602.

Figure 7:
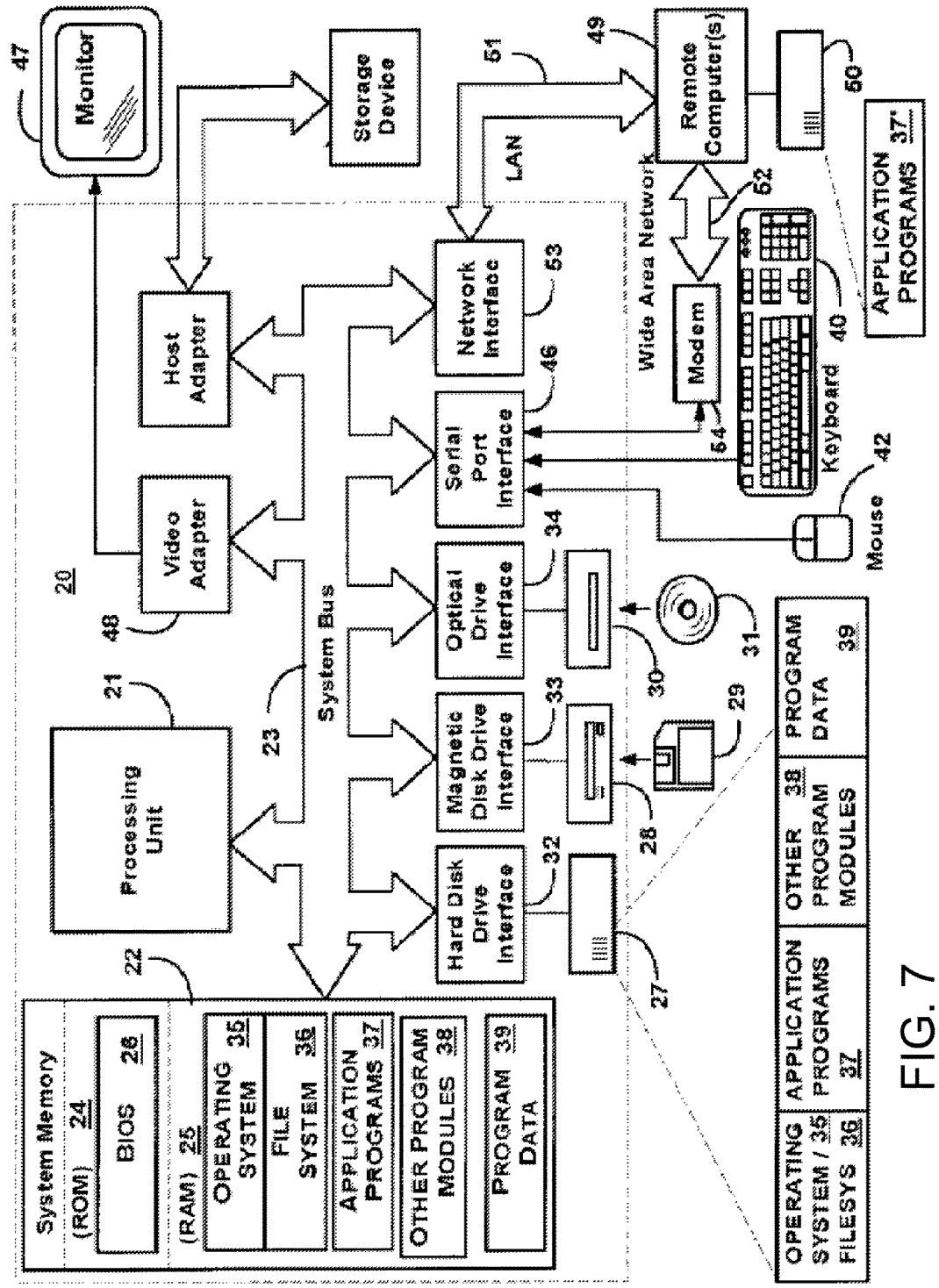
FIG. 7 is a schematic diagram illustrating an exemplary system or server capable of implementing one embodiment of improved GC operation in accordance with one embodiment of the present invention.

FIG. 7 is a schematic diagram illustrating an exemplary system or server capable of implementing one embodiment of improved GC operation in accordance with one embodiment of the present invention. The system includes a general purpose computing device in the form of a personal computer (or a node) 20 or server or the like, including a processing unit 21, a system memory 22, and a system bus 23 that couples various system components including system memory 22 and processing unit 21. System bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within computer 20, such as during start-up, is stored in ROM 24. Personal computer/node 20 may further include a SSD or a hard disk drive for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive, magnetic disk drive 28, and optical disk drive 30 are connected to system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for personal computer 20. In one aspect, computer 20 also includes an SSD for storage wherein the SSD is able to activate the embodiment of GC process to improve the performance of SSD.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably WINDOWS™). Computer 20 includes a file system 36 associated with or included within operating system 35, such as the WINDOWS NT™ File System (NTFS), one or more application programs 37, other program modules 38 and program data 39. A user may enter commands and information into computer 20 through input devices such as a keyboard 40 and pointing device 42.

Other input devices (not shown) may include a microphone, joystick, game pad, satellite dish, scanner or the like. These and other input devices are often connected to processing unit 21 through a serial port interface 46 that is coupled to the system bus, but may be connected by other interfaces, such as a parallel port, game port or universal serial bus (USB). A monitor 47 or other type of display device is also connected to system bus 23 via an interface, such as a video adapter 48.

In addition to monitor 47, personal computers typically include other peripheral output devices (not shown), such as speakers and printers. A data storage device, such as a SSD, a hard disk drive, a magnetic tape, or other type of storage device is also connected to system bus 23 via a host adapter via a connection interface, such as Integrated Drive Electronics (IDE), Advanced Technology Attachment (ATA), Ultra ATA, Small Computer System Interface (SCSI), SATA, Serial SCSI and the like.

Computer 20 may operate in a networked environment using logical connections to one or more remote computers 49. Remote computer (or computers) 49 may be another personal computer, a server, a router, a network PC, a peer device or other common network node, and typically includes many or all of the elements described above relative to computer 20. Computer 20 may further include a memory storage device 50. The logical connections include a local area network (LAN) 51 and a wide area network (WAN) 52. Such networking environments are commonplace in offices, enterprise-wide computer networks, Intranets and the Internet. When used in a LAN networking environment, computer 20 is connected to local area network 51 through a network interface or adapter 53.

When used in a WAN networking environment, personal computer 20 typically includes a modem 54 or other means for establishing communications over wide area network 52, such as the Internet. Modem 54, which may be internal or external, is connected to system bus 23 via serial port interface 46. In a networked environment, program modules depicted relative to personal computer 20, or portions thereof, may be stored in the remote memory storage device. It will be appreciated that the network connections shown are exemplary and other means of establishing a communications link between the computers may be used.

The exemplary embodiment of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

Figure 8:
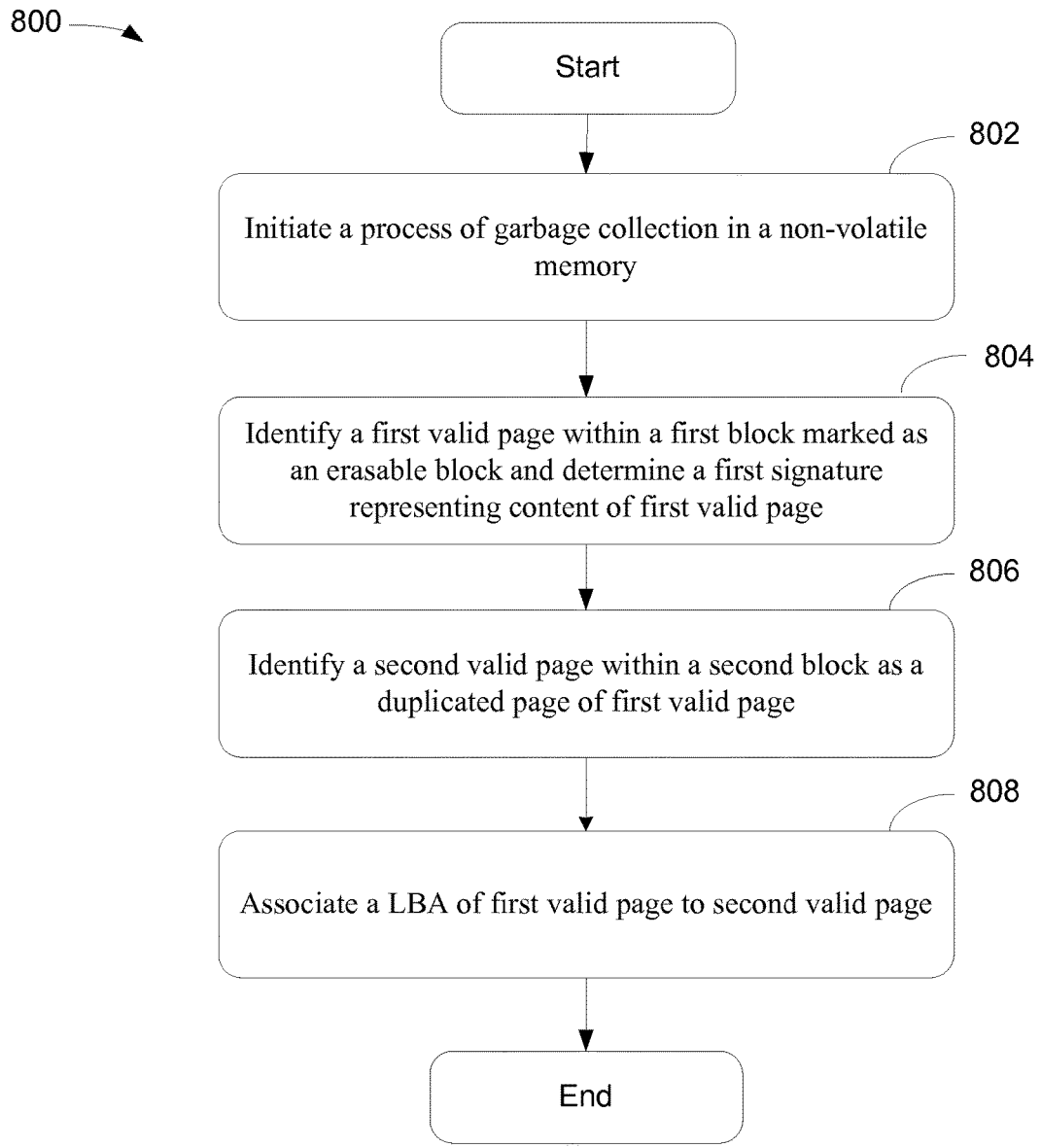
FIG. 8 is a flowchart illustrating a process of improved garbage collection process in accordance with one embodiment of the present invention.

FIG. 8 is a flowchart 800 illustrating a process of improved garbage collection process in accordance with one embodiment of the present invention. At block 802, a process initiates a GC in a flash memory in response to a predefined triggering event for recovering storage space. For example, the GC process can be activated in response to detecting expired blocks, high error rate during page read, exceed total read times, or high invalid pages.

At block 804, upon identifying a first valid page within a first block marked as an erasable block, a first signature representing the content of the first valid page is determined by a signature generator. For example, the process is capable of hashing the content of the first valid page to generate a unique value representing the first valid page.

At block 806, a second valid page is identified within a second block as a duplicated page of the first valid page when the first signature matches with a signature associated with the second valid page. For example, the first signature is compared with multiple signatures stored in a signature table in a SDD controller.

At block 808, the GC process associates LBA of the first valid page to the second valid page. For example, the FTL is updated to make the LBA of the first valid page to point to the PPA of second valid page. If the first signature does not match with anyone of signatures stored in the signature database, a compressor, in one embodiment, compresses the content of the first valid page to generate a compressed page which uses fewer bytes to represent the content of the first valid page. The compressed first valid page is subsequently rewritten to a new block or valid block.

In another embodiment, the GC process is capable of arranging and rewriting the compressed valid pages including compressed first valid page in a sequential order. A signal is issued to the process of GC indicating the first valid page has been moved. The erasable block is subsequently deleted or erased.

While particular embodiments of the present invention have been shown and described, it will be obvious to those skilled in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for recovering storage space from pages containing stale data in a memory system, comprising:
   initiating a process of garbage collection ("GC") in a non-volatile memory in accordance with at least one of predefined triggering events;
   identifying a first valid page within a first block marked as an erasable block and generating a first signature representing content of the first valid page in response to the process of GC;
   comparing the first signature with a plurality of valid signatures in a signature table to identify a duplicated page of the first valid page at a second valid page based on matching signature values;
   updating content of a pointer in a physical page address ("PPA") of the first valid page in a flash translation table ("FTL") to associate the first valid page to the second valid page;
   compressing content of the first valid page to reduce number of bytes representing the content of the first valid page when the first signature does not match with signatures stored in the signature table;
   arranging a plurality of compressed valid pages including compressed first valid page in a sequential order; and
   writing the plurality of compressed valid pages to a new block in the sequential order.

2. The method of claim 1, further comprising issuing a signal to the process of GC indicating the first valid page has been moved.

3. The method of claim 1, wherein the writing the plurality of compressed valid pages includes writing the compressed first valid page to the new valid block.

4. The method of claim 1, further comprising:
   arranging a plurality of valid pages including the first valid page in a sequential order when the first signature does not match with signatures stored in the signature table; and
   writing a plurality of compressed valid pages to a new block in the sequential order.

5. The method of claim 1, wherein initiating a process of GC in a non-volatile memory includes activating the process of GC to remove stale data from a flash memory in response to one of detecting expired blocks, high error rate during page read, exceed total read times, and high invalid pages.

6. The method of claim 1, wherein generating a first signature representing content of the first valid page includes hashing the content of the first valid page to generate a unique value representing the first valid page.

7. The method of claim 1, wherein comparing the first signature with a plurality of valid signatures in the signature table includes comparing the first signature with a plurality of signatures stored in the signature table in a solid state drive ("SSD") controller.

8. The method of claim 1, wherein updating content of a pointer in a physical page address ("PPA") of the first valid page includes updating the FTL to point a logical block address ("LBA") of the first valid page to the second valid page.

9. A memory device comprising:
   a plurality of non-volatile memory blocks wherein each of the plurality of non-volatile memory blocks includes a set of non-volatile memory pages configured to store information persistently; and
   a memory controller coupled to the plurality of non-volatile memory blocks and configured to manage the plurality of non-volatile memory blocks, wherein the memory controller includes:
   a garbage collection ("GC") manager configured to recover storage space based on a predefined GC triggering events; and
   a de-dupe module coupled to the GC manager and configured to identify a duplicated page for a valid page within an erasable block based on signature comparison via a signature table; and
   a flash translation table ("FTL") coupled to the de-dupe module and configured to include physical page addresses ("PPAs") wherein each of PPA includes a pointer for pointing to a duplicated page;
   a compressor coupled to the FTL and configured to compressing content of a first valid page to reduce number of bytes representing the content of the first valid page when a first signature does not match with signatures stored in the signature table, wherein compressed first valid page is arranged in a sequential order, wherein a plurality of compressed valid pages is written to a new block in the sequential order.

10. The device of claim 9, wherein the compressor is configured to generate a compressed valid page in accordance with content of the valid page before rewriting the compressed valid page to a new block.

11. The device of claim 9, wherein the memory controller further includes a sequencer configured to arrange a plurality of valid pages in a sequential order before the valid pages are moved into one or more blocks.

12. The device of claim 9,
   wherein the plurality of non-volatile memory blocks is a group of flash memory blocks wherein each block includes 256 pages of flash memory; and
   wherein the garbage collection manager includes a garbage collection scan and garbage block identifier configured to identify one or more valid pages in a garbage block.

13. The device of claim 9, wherein the de-dupe module includes a hasher configured to generate a signature in accordance with hashing content of a page, wherein the signature table is coupled to the hasher and configured to store a plurality of signatures associated with a plurality of pages.

14. A method for recovering storage space in a memory system, comprising:
   initiating a process of garbage collection ("GC") in a flash memory in accordance with at least one of predefined triggering events;
   identifying a first valid page within a first block marked as an erasable block and compressing content of the first valid page to reduce number of bytes representing the content of the first valid page in response to the process of GC;

writing compressed first valid page to a new valid block and storing a signature associated to the first valid page in a signature table;

updating a physical page address ("PPA") associated with the first valid page situated in a flash translation table to indicate the new valid block containing the compressed first valid page; and issuing a signal to the process of GC indicating that the first valid page has been moved from the erasable block.

15. The method of claim 14, further comprising:

arranging a plurality of compressed valid pages including compressed first valid page in a sequential order; and writing the plurality of compressed valid pages to a new block in the sequential order.

16. The method of claim 14, wherein initiating a process of GC includes activating the process of garbage collection to remove stale data from a flash memory in response to one of detecting expired blocks, high error rate during page read, exceed total read times, and high invalid pages.

17. The method of claim 14, further comprising determining a first signature representing content of the first valid page in accordance with a predefined signature generator.

18. The method of claim 17, further comprising identifying a second valid page within a second block as a duplicated page of the first valid page when the first signature matches with a signature associated with the second valid page.

* * * * *